United States Patent [19]

Blount

[11] Patent Number: 5,002,690

[45] Date of Patent: Mar. 26, 1991

[54] PRODUCTION OF STABLE LIQUID ORGANIC-POWDERED INORGANIC EMULSION

[76] Inventor: David H. Blount, 6728 Del Cerro Blvd., San Diego, Calif. 92120

[21] Appl. No.: 309,236

[22] Filed: Feb. 13, 1989

[51] Int. Cl.$^5$ .......................... B01F 3/12; B01F 17/02; B01F 17/04; B01F 17/14
[52] U.S. Cl. .......................... 252/182.14; 252/182.15; 252/182.17; 252/309; 252/352
[58] Field of Search .............. 252/309, 182.14, 182.15, 252/182.17, 352

[56] References Cited

U.S. PATENT DOCUMENTS

| Re. 31,340 | 8/1983 | Blount | 524/650 |
|---|---|---|---|
| 3,248,229 | 4/1966 | Pader et al. | 252/352 |
| 3,737,426 | 6/1973 | Throckmorton et al. | 252/352 |
| 4,282,129 | 8/1981 | Blount | 521/122 |
| 4,296,211 | 10/1981 | Blount | 521/154 |
| 4,325,859 | 4/1982 | Blount | 521/122 |
| 4,376,178 | 3/1983 | Blount | 525/58 |
| 4,737,525 | 4/1988 | Blount | 521/122 |
| 4,743,624 | 5/1988 | Blount | 521/106 |
| 4,778,844 | 10/1988 | Blount | 524/706 |
| 4,885,332 | 12/1989 | Bilkadi | 252/182.17 |
| 4,904,411 | 2/1990 | Novich et al. | 264/212 |

*Primary Examiner*—John Kight, III
*Assistant Examiner*—Rabon Sergent

[57] ABSTRACT

Liquid organic-powdered inorganic compound emulsions and suspensions are produced by reacting an inorganic polybasic salt forming acidic compound with a liquid organic compound then emulsifying the liquid organic-inorganic compound with a powdered inorganic compound. The liquid organic-powdered inorganic compound may be utilized in the production of polyurethane foam; polyepoxy material or polyester material containing powdered inorganic fillers or reactants.

23 Claims, No Drawings

PRODUCTION OF STABLE LIQUID ORGANIC-POWDERED INORGANIC EMULSION

BACKGROUND OF THE INVENTION

This invention relates to a process for the production of stable organic-inorganic emulsions and suspensions consisting of a solid inorganic compound, in the form of a powder, in an organic liquid. The stable organic-inorganic emulsions and suspension are produced by reacting a polybasic salt forming acidic compound with an organic compound thereby producing an organic-inorganic surface active compound, then adding a finely powdered solid inorganic compound and then emulsify the mixture. It is not necessary to add additional emulsifiers to produce a stable emulsion or suspension.

Organic-inorganic emulsions and suspensions were produced in U.S. Pat. Nos. 4,743,624, 4,737,525, 4,778,844, 4,282,129; 4,325,859; 4,376,178; 4,296,211 and Re. 31,340 by utilizing a thixotropic agent, in the form of a silicate, to stabilize the emulsion. In this invention a thixotropic silicate is not necessary because in the invention a portion of the organic liquid is reacted with an inorganic salt-forming acidic compound to produce organic-inorganic surface active compounds which stabilizes the liquid organic-solid inorganic emulsions or suspensions.

SUMMARY OF THE INVENTION

While not wishing to be bound by the theory of operation, it appears that there is a surface active effect produced when the salt-forming acidic compound reacts with the liquid organic compound. It also enhances the compatibility of an inorganic powder to remain in an emulsified or suspended state. Also part of the liquid organic molecules are converted to an organic-inorganic molecule which has a surface active effect on the emulsion.

In certain uses of the emulsion or suspension of this invention it is necessary to adjust the pH of the emulsion or suspension. This may be accomplished by adding the necessary amount of a salt-forming basic compound to react with the salt-forming acidic compound. This addition of a salt-forming basic compound is not detrimental to the stability of the emulsion or suspension. The emulsions and/or suspensions of this invention has remained emulsified or suspended ranging for days to years. Some of the suspensions or emulsions may partially settle out but are readily re-emulsified by agitation. The powdered inorganic compound may act as a filler or a reactant when the emulsions or suspension of this invention is used to make finish products.

Inorganic-organic emulsions or suspensions may be produced by admixing and reacting the following components:
(A) a liquid organic compound that will react with an inorganic polyvalent acid salt forming compound; in the amount of 100 parts by weight;
(B) inorganic polyvalent acid salt forming compound; in the amount of 0.5 to 20 parts by weight;
(C) inorganic powder; in the amount of 1 to 200 parts by weight;
(D) salt forming basic compound; in the amount of up to 200 parts by weight The said mixing is carried out in such a way that Components A and B are reacted first to produce an organic-inorganic surface-active compound then component C and D are added. Components A, B and C may be mixed simultaneously if Component C is inert and won't react with Component A or B.

Component A

Any suitable liquid organic compound that will react with an inorganic polyvalent salt forming acidic compound may be used in this invention. Suitable liquid organic compounds or polymers are, but not limited to, polyols, polyester, polyamides, polyepoxy, alcohols, polyethers, polycarboxyl, phenoplasts, aminoplasts, amines, polyamines, polythioesters, polyacetals, polycarbonates, polyester amides, silicones, vegetable oils and mixtures thereof. Compounds or polymers that contain ionic groups such as:

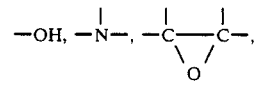

—CH=O, aryl radicals, and saturated hydrocarbons having tertiary hydrogen may be used in this invention. The organic polymer may also be solid but placed in a solvent to form a solution then reacted with the inorganic salt-forming acidic such as a solid unsaturated polyester resin in styrene to form a polyester resin. Polyol is the preferred liquid organic compound.

Component B

Any suitable inorganic polyvalent acid salt forming compound may be used in this invention. Suitable salt forming compounds include but not limited to acidic salt-forming compounds of phosphorus and sulfur and mixtures thereof.

Suitable acidic salt-forming compounds of phosphorus include, but not limited to, phosphoric acid, phosphinic acid, phosphinous acid, phosphine oxide, phosphorus trichloride, alkylchlorophosphines, organic acid phosphate, phosphorus oxychloride, monoaluminum phosphate, hydrogen-containing salts of phosphoric acid, hypophosphorous acid and mixtures thereof.

Suitable acidic salt-forming compounds of sulfur include, but not limited to, sulfuric acid, hydrogen-containing salts of sulfuric acid, sulfurous acid, sulfur dioxide, sulfur trioxide, sulfuryl chloride, thionyl chloride, pyrosulfuric acid, chlorosulfonic acid, sulfamic acid, etc. and mixtures thereof.

Salt-forming inorganic acidic compounds react with the liquid organic compound to produce ionic groups on some of the molecules of the liquid organic compounds. The ionic group need not necessarily be preformed salt groups but may be reacted with a basic-salt forming compound, such ionic groups are: —N(+)—, —S(+)—, —P(+)—, —SO$_2$(−)—, —O—SO$_2$−,

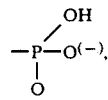

—SO$_2$—N(−)—SO$_2$

Phosphoric acid is the preferred inorganic salt-forming acidic compound.

Component C

Any suitable powdered inorganic compound may be used in this invention. Suitable inorganic compounds include, but not limited to oxidated silicon, compounds, alkalimetal compounds, alkaline earth metal compounds, metal compounds, natural minerals, phosphorus compounds, and mixtures thereof.

Suitable alkali metal compounds include compounds which contain sodium, potassium, lithium, rubidium and cesium. These compounds may be in the form of alkali metal, but are not limited to, oxides, hydroxides, carbonates, salts of organic acids, inorganic salts, bicarbonates, natural minerals, silicates, etc. and mixtures thereof.

Suitable alkaline earth metals compounds include compounds which contain calcium, strontium, magnesium and barium. These compounds may be in the form of alkaline earth metal, but not limited to, metals, oxides, hydroxides, carbonates, salts of organic acids, inorganic salts, natural minerals, silicates, etc. and mixtures thereof.

Suitable metal compounds include compounds which contain beryllium, copper, zinc, titanium, zirconium, lead, arsenic, antimony, bismuth, molybdenum, tungsten, manganese, iron, nickel and cobalt. Suitable metal compounds include, but not limited to, metals, oxides, hydroxides, carbonates, salts of organic acids, inorganic salts, natural minerals, silicates, etc., and mixtures thereof.

Oxidated silicon compound is the preferred powdered inorganic compound, such as silica, polysilicic acid, alkali metal silicates, alkaline earth metal silicates, mineral containing silicates, and mixtures thereof.

Component D

Any suitable salt-forming basic compounds may be used in this invention. Suitable salt-forming basic compounds include but not limited to alkali metal compounds, alkaline earth metal compounds, metal compounds, ammonia compounds and mixtures thereof. The various suitable alkali metal, alkaline earth metal and metal compounds are listed in Component (C). Salts containing phosphorous and sulfur are not suitable as a salt-forming basic compound.

Suitable ammonium compounds include, but not limited to, compounds containing ammonium radicals, such as ammonia, amino compounds, e.g., urea, alkylureas, decyandiamide, melamine, guanidine, aminoguanidine, amines, e.g., aliphatic amines, aromatic amines, organic ammonium salts, e.g., ammonium acetate, organic ammonium oxalate, etc. ammonium carbonate, quaternary ammonium hydroxide, ammonium silicate and mixtures thereof.

DETAIL DESCRIPTION

The preferred method to produce a stable liquid organic-powdered inorganic emulsion or suspension is to mix Components A and B and allow them to react thereby producing an organic-inorganic surface active compound, then add Components C and D while emulsifying or agitating the mixture at ambient temperature and pressure, but in certain reactions between A and B Components, the chemical reaction may be speeded up by increasing the temperature and/or pressure especially when one of the components is in the form of a gas. When Component C is inert and does not react with Component A or B then Components A, B and C may be added simultaneously. The chemical reaction between Components A and B may take place within a few minutes or may take 6-12 hours before a liquid organic-inorganic surface active compound is produced. Some liquid polymerizable polymers such as polyepoxy compounds are polymerized by an acid such as phosphoric acid so it is necessary to add the acid very slowly and use only a minimal amount and after the acid reacts with the polymer it is necessary to add a salt-forming basic compound to the mixture.

Other components may be added to the mixture of this invention. The components added will depend on the end use of the emulsion. When the emulsion is a polyol-powdered inorganic compound emulsion, it is desirable to add surface-active additives such as emulsifiers and foam stabilizers in an amount up to 20% by weight of each, based on weight of all components of the mixture. Suitable emulsifiers are, e.g., the sodium salts of ricinoleic sulphonates or of fatty acids or salts of fatty acids with amines, alkali metal or ammonium salt of sulphonic acid such as dodecylbenzene sulphonic or dinapthyl methane disulphonic acid, etc. The foam stabilizers used are mainly water-soluble polyester siloxanes such as the kind described in U.S. Pat. No. 3,629,308.

Suitable flame-resistant compounds may be used when desired in the products of this invention such as those which contain halogen, phosphorus or mixtures thereof. Useful flame-resistant compounds are described in Kunststoff-Handbuch, Volume VII, Munich. 1966, pages 110 and 111, which are incorporated herein by reference.

In the production of foamed products using the stable liquid organic-powdered inorganic compound emulsion, blowing agent such as freon, water, compounds containing attached water, may be added to the emulsion. Suitable blowing agents that boil between $-25°$ C. and $80°$ C. such as acetone, ethyl acetate, methanol, halogenated alkanes, butane, hexane, diethyl ether, compounds that decompose at a temperature above room temperature with liberation of a gas, compressed gases, e.g., air, $CO_2$, nitrogen, etc., may be used in this invention.

In the production of polyurethane foam products, activators (catalyst) which act as curing agents, e.g., tertiary amines, organo-metallic compound and other examples of catalysts, may be used according to this invention. Details of their action are describes in Kunstsoff-Handbuch, Carl-Hanser-Verlag, Munic, 1966, e.g., on page 96 and 102. These may be used in the amount up to 10%, based on weight of all components, and added to the emulsion or suspension of this invention.

Polyurethane products are produced by reacting a compound which contains at least two isocyanate radicals or a compound which contains at least one isocyanate radical and an unsaturated bond which will polymerize with a catalytic amount of free-radical initiator with a liquid organic polymer-powdered inorganic compound emulsion produced by the process of this invention and the liquid organic polymer must contain one or more active hydrogen that will react with an isocyanate radical, such as alcohols, polyols, amines, polyamines, polyester polymers, polyepoxy resins, polycarboxylic compounds, polythioethers, polyacetals, polycarbonates, polyester amides, phenols, natural polyols, etc. and mixtures thereof Any suitable liquid polyol (organic polyhydroxyl compound), in particular, compounds which contain from 2 to 8 hydroxyl groups, especially those with a molecular weight of about 400 to about 6,000, e.g. polyesters, polyethers, polythioethers, polyacetals, polycarbonates or polyester amides containing at least 2, generally from 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bisglycol terephthalate. Any suitable polyhydric alcohol may be used such as, for example, ethylene glycol; propylene-1-2 and -1,3-glycol; butylene-1,4- and -2,3-glycol; propylene-1,2- and -1,3-glycol; butylene-1,4- and -2,3-glycol; hexane-1,6-diol; octane-1,8-diol; neopentyl glycol; cyclohexanedimethanol-1(1,4-bishydroxymethyl-cyclohexane); 2-methylpropane-1,3-diol; glycerol: trimethylol propane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as -caprolactone, or hydroxycarboxylic acid such as hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenyl propane, aniline, ammonia, ethanolamine or ethylenediamine; sucrose polyethers such as those described, e.g., in German Auslegeschriften Nos. 1,175,358 and 1,064,938, may also be used according to the invention. It is frequently preferred to use polyethers which contain predominantly primary OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation of thiodiglycol with itself and/or with other glycols, dicarboxylic acids, formaldehyde, aminocarboxylic acids or amino alcohols. The products obtained are polythio-mixed ethers or polythioether ester amides, depending on the co-component.

The polyacetals used may be, for example, the compounds which may be obtained from glycols, 4,4'-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkaline oxides with phenol formaldehyde resins or with urea-formaldehyde resins are also suitable for the purpose of the invention.

Examples of these compounds which are to be used according to the invention have been described in High Polymers, Volume XVI, "Polyurethane, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen, Carl-Hanser-Verlag, Munich, 1966 on pages 45 to 71.

Any suitable compound which contains one or more active hydrogens may be used in this invention such as alcohols, thioalcohols, phenols, thiophenols, aldehydes, carboxylic acid bromides, sulphonic acid chlorides, organic esters, ethers, thioethers, halomethyl compounds, ketones, nitriles, sulphonic acids, amines and mixtures thereof. Compounds which contain one OH group and/or at least one other hydrophilic and/or polar group which has the general formulae: RSH, $RCH_2CL$, $RDW_2Br$, $RCH_2I$, RCN, $RNO_2$, RCOCL, RCOBr, $RSO_2CL$, RCOOH, $RS_3OH$, $RCOO^-$, $RSO_3^-$, ROR,

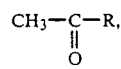

wherein R denotes a methyl, ethyl or propyl group, may be used in this invention.

Any suitable epoxy compound may be used in this invention. Suitable epoxy compounds include but are not limited to ethylene oxide, propyleneoxide, butylene oxide, tetrahydrofuran, styrene oxide, epihalohydrins and polyepoxy compounds. Polyepoxy compounds are preferred, but not limited to, a list of suitable polyepoxy compounds is found in U.S. Pat. No. 4,292,413 page 2-4 and is incorporated into this application. The polyepoxy compounds are well known in the Arts and are the preferred epoxy compound.

Any suitable organic compound containing at least 2 isocyanate radicals may be used in this invention. Suitable organic polyisocyanates may be aliphatic, cycloaliphatic, araliphatic, aromatic and heterocyclic polyisocyanates are well known in the arts. Suitable polyisocyanates which may be employed in the process of the invention are exemplified by the organic diisocyanate which are compounds of the general formula:

$$O=C=N-R-N=C=O$$

wherein R is a divalent organic radical such as an alkaline, aralkylene or arylene radical. Such radicals may contain, for example 2 to 20 carbon atoms. Other polyisocyanates, polyisothioryanates, fatty diisocyanates, and their derivatives may be equally employed. Inorganic and silicon polyisocyanate are also suitable according to the invention. Examples of useful polyisocyanate may be found listed in U.S. Pat. No. 4,296,211, page 4–6, in High Polymers, Volume XVI, "Polyurethane Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199 and are incorporated herein by reference.

It's generally preferred to use commercially readily available polyisocyanate, e.g., tolylene-2,4 and -2,6 diisocyanates and any mixtures of these isomers ("TDI") Polyphenyl-polymethylene-isocyanates obtained by aniline-formaldehyde condensation followed by phosgenation and modified polyisocyanates. The preferred compound with at least two isocyanate radicals are polyphenyl-polymethylene-isocyanates obtained by aniline-formaldehyde condensation followed by phosgenation.

Any suitable compound which contains 1 or more isocyanate radicals and one or more unsaturated bonds which will polymerize may be used in this Invention. The unsaturated aliphatic isocyanates which has double-bond vinyl functionality in the same molecule are preferred. Hydroxyethyl methacrylate may be reacted with tolylene diisocyanate or with NCO-terminated prepolymer to produce compound with vinyl functionality and isocyanate functionality in the same molecule. The double-bond vinyl radical may be cured with free-radical initiators such as an organic hydroperoxide. The isocyanate radical may be cured and foamed with a compound containing attached water.

Solid inert fillers may be added to the components. They may be organic or inorganic substances and may be in the form of powders, hollow beads, granulate, wire, fibers, dumb bells, crystallites, spirals, rods, beads, foam particles, webs, woven fabric, ribbons, etc. Any commonly known inert filler known in the Arts may be used.

Any suitable initiator which will promote the polymerization of a solution of a vinyl monomer may be used in this invention. The controlled polymerization of the vinyl monomer in the aqueous alkali metal silicate, in order to yield fully cured solids, usually required the use of an initiator. Only a catalytic amount of an initiator is needed and the amount may vary up to 1% by weight based on the vinyl monomer.

Any suitable free-radical initiator, such as organic and inorganic peroxides, azo compounds, alkali metal persulfates, ammonium persulfates and mixtures thereof, may be used. The fact that the action of organic peroxide can be modified by activators and promoters, plus their ready availability at reasonable cost, makes them preferably in this invention. Thermal and photopolymerization may be used in certain cases.

Suitable organic peroxide initiators include, but are not limited to, acetyl benzoyl peroxide, methyl ethyl ketone peroxide, cyclohexanone peroxide, cyclohexyl hydroperoxide, 2,4-dichlorobenzoyl peroxide, cumene hydroperoxide, tert-butyl hypoperoxide, methyl amyl ketone peroxide, lauryl peroxide, benzoyl peroxide, tert-butyl perbenzoate, di-tert-butyl diperphthalate, and mixtures thereof.

Activators and promoters, used in conjunction with the initiators such as cobalt which, in the form of its ethyl hexanoate or naphthanate salt, is a good, general-purpose activator for use with ketone peroxides, may be added to the vinyl monomer. Concentration as low as 30 ppm of cobalt metal will activate a system.

Other activators may be added to the vinyl monomers such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

Promoters used with acyl peroxide include tertiary dialkyl aryl amines such as diethyl aniline and aliphatic thiols, such as, for example, lauryl mercaptan. Concentrations used are most often in the range of up to 0.5% of active substances. Promoters usually are strong reducing agents and initiators are strong oxidizing agents.

Suitable alkali metal persulfates include potassium and sodium persulfate. Redox systems may also be utilized in this invention.

Epoxy catalyst may be used with the epoxy compounds. Suitable epoxy catalyst include amines, Lewis acids, alkali metal oxides and hydroxides and mercaptan-terminated liquid compounds. A list of these compounds may be found in U.S. Pat. No. 4,383,089 pages 5–12 and is incorporated into this Application.

Any suitable flame-retardant agent may be used in this invention such as alkali metal phosphate compounds, alkaline metal earth phosphate compounds, ammonium phosphates and other salts of phosphoric acid, halogenated paraffins, organic phosphorus containing compounds, organic phosphorus and halogen containing compound and other flame-retardant agents commonly known in the Arts. Other substances such as plasticizers, dyes, stabilizers, negative catalyst, pigments, stabilizers against aging and weathering, fungicidal and bacteriocidal substances may be used in this invention. Details about methods of using these additives and their action may be found in Kunststoff-Handbuch, Volume VI; published by Vieweg and Hochtlen, Carl-Hansen-Verlag, Munich 1966, e.g. on pages 103 to 113.

Polyurethane products have many uses and these uses are well known in the Arts. The polyurethane foam produced by this invention may be used for cushioning, packaging, sound and thermal insulation, as an adhesive, as construction material, as shoe soles, as coating agent, as cavity filler, etc.

The reactive components may be mixed and sprayed in any of the well known polyurethane foaming machines to produce in-situ insulation. The components may be used in a two component system, mixed then poured in place such as in boats for flotation. The mixed components may be pumped into molds to form auto or furniture cushions, art objects, building materials, insulation, paneling, etc.

The liquid organic-powdered inorganic compound emulsion may be used in the production of paints, varnishes, caulking compounds, polyurethane solids and foams, adhesives, coating agents, molding compounds, sound and thermal insulation products, casting products, etc. The polyol-powdered inorganic compound emulsion may be reacted with polyisocyanates to produce foams for insulation, cushioning, cavity fillers, etc., and solid products such as car bumpers, auto bodies, containers, sheets, wall panels, doors, etc. The polyester resin and/or polyepoxy-powdered inorganic compound emulsion may be mixed with a catalyst then poured or applied to a mold or fiberglass to produce useful objects such as boats, car bodies, art objects, panels, etc.

Optional components may be added in any suitable proportions, the preferred proportions being:
1. up to 20% by weight of an emulsifying agent
2. up to 20% by weight of a foam stabilizer
3. up to 10% by weight of a urethane catalyst
4. up to 200% by weight of organic particulate or pulverulent material
5. up to 10% by weight of a flame-retardant agent
6. up to 25% by weight of phase-change material
7. up to 5% by weight of a free radical-initiator, only a catalytic amount is necessary
8. up to 20% by weight of an inert liquid, boiling in the range of $-25°$ C. to $80°$ C.
9. 100 parts by weight of a liquid polyepoxy-powdered inorganic emulsion reacted with 25 to 100 parts by weight of a liquid polyamine-powdered inorganic compound emulsion
10. 1 to 100 parts by weight of liquid polyol-powdered inorganic compound emulsion with 10 to 100 parts by weight of a compound containing at least two isocyanate groups
11. 5 to 100 parts by weight of liquid polyol-powdered inorganic compound emulsion with 25 to 100 parts by weight of an unsaturated aliphatic isocyanate
12. 100 parts by weight of liquid polyepoxy-powdered inorganic compound emulsion with 25 to 100 parts by weight of an epoxy catalyst The above percentages are based on the weight of all the components.

The primary objects of this invention are to produce novel stable liquid organic-powdered inorganic emulsions and suspension. Another object is to produce stable liquid organic-powdered inorganic emulsion and suspensions which are useful to produce useful products at a lower cost by using inexpensive powdered inorganic compounds in production of useful products. Another object is to produce polyol-powdered inorganic compound emulsion which will react with polyisocyanates to produce useful solid and foamed products. Another object is to produce liquid polymerizable organic polymer-powdered inorganic compound emulsions which can be catalyzed to produce solid useful objects. Another object is to produce novel organic-inorganic surface active compounds.

DESCRIPTION OF PREFERRED EMBODIMENTS

My invention will be illustrated in greater detail in the specific Examples which follow, which detail the preferred embodiments of my process. It should be understood that the scope of my invention is not limited to the specific processes set out in the Examples. Parts and percentages are by weight, unless otherwise indicated.

EXAMPLE 1

About 100 parts by weight of a liquid polyol (polypropylene triol, mol. wt. 3000, hydroxyl no. -56) and 3 parts by weight of 75 percent phosphoric acid are mixed and agitated for 10 to 30 minutes thereby producing polypropylene triol-phosphoric acid surface active polymers, then about 100 parts by weight of finely powdered sodium silicate glass ($SiO_2:Na_2O$ ratio of 3.25:1) is added and agitated for 5–10 minutes thereby producing a polypropylene triol-powdered sodium silicate emulsion.

EXAMPLE 2

Example 1 is modified wherein concentrated sulfuric acid is used in place of phosphoric acid and reacted with the polyol thereby producing a polyol-sulfuric acid surface active compound.

EXAMPLE 3

Example 1 is modified wherein the sodium silicate is replaced with a powdered inorganic compound that will pass through a 200 mesh screen and selected from the list below:
(a) talc
(b) meca
(c) clay
(d) potassium silicate glass
(e) asbestos
(f) silica
(g) calcium silicate
(h) calcium carbonate
(i) zinc oxide
(j) titanium oxide
(k) Barium sulfate
(l) glass
(m) kaolin
(n) natural zeolite
(o) aluminum oxide
(p) iron oxide
(q) aluminum
(r) magnesium oxide
(s) magnesium silicate
(t) ammonium silicate
(u) nickel carbonate
(v) polysilicic acid
(w) lead oxide
(x) copper
(y) silicon carbide
(z) mixtures of the above

EXAMPLE 4

Example 1 is modified wherein the polypropylene triol is replaced with a compound selected from the list below:
(a) polypropylene diol, mol. wt. 1000, (hydroxyl no. 180)
(b) sucrose polyol, (hydroxyl no. 380)
(c) castor oil
(d) linseed oil
(e) polyester polyol
(f) aromatic polyester polyol, (hydroxylene 350)
(g) liquid formaldehyde phenol resin
(h) propylene glycol
(i) polybutylene glycol
(j) amine sucrose polyether polyol (hydroxyl no. 350)
(k) ethylene-propylene polyether diol (hydroxyl no. 36)
(l) glycerol
(m) liquid polyamide
(n) pentaerythritol
(o) butylene glycol
(p) triethylene glycol (q) trimethylol propane
(r) propylene polyether triol capped with ethylene glycol (hydroxyl no. 57)
(s) propylene-ethylene polyether triol (hydroxyl no. 56)
(t) propylene polyether triol (hydroxyl no. 42)

EXAMPLE 5

About 100 parts by weight of a polyepoxy resin (Bisphenol A epoxy resin) is chemically reacted with 2 parts by weight of 75% phosphoric acid by slowly adding drops of the acid while agitating for about 10 minutes then 50 parts by weight of powdered sodium silicate glass ($SiO_2:Na_2O$ ratio of 3.25:1) is added and emulsified thereby producing a stable polyepoxy resin-powdered sodium silicate glass emulsion.

EXAMPLE 6

Example 5 is modified wherein another liquid polyepoxy resin selected from the list below is used in place of the Bisphenol A epoxy resin:
(a) phenol novalac epoxy resin
(b) triphenylolmethane epoxy resin
(c) polypropylene glycol epoxy resin
(d) methylene dianiline epoxy resin
(e) P-amino phenol epoxy resin
(f) dimer acid epoxy resin
(g) mixtures thereof

EXAMPLE 7

Example 5 is modified wherein another liquid organic compound is used in place of the polyepoxy resin and selected from the list below:
(a) maleic anhydride-adipic acid-diethylene glycol-methyl methacrylate polyester resin
(b) fumaric acid-propylene glycol-stryrene polyester resin
(c) maleic anhydride-phthalic anhydride-ethylene glycol-vinyl acetate polyester resin
(d) polyphenyl-polymethylene-isocyanates obtained by aniline-formaldehyde condensation followed by phosgenation
(e) toluene diisocyanate ("TDI")
(f) poly (furfural) polymer
(g) diethylenetriamine fatty acid condensation product
(h) polyepichlorohydrin
(i) poly (acetone-furfural) polymer

EXAMPLE 8

Example 5 is modified wherein another powdered inorganic compound that will pass through a 100 mesh screen is used in place of sodium silicate glass and selected from the list below:
(a) 40 parts by weight of silica and 10 parts by weight of calcium carbonate
(b) talc
(c) clay
(d) wollastonite
(e) calcium carbonate
(f) asbestos
(g) 45 parts by weight of polysilicic acid and 5 parts by weight magnesium carbonate
(h) magnesium oxide
(i) magnesium silicate
(j) potassium silicate
(k) meca
(l) nickel carbonate
(m) aluminum hydroxide
(n) kaolin
(o) natural zeolite
(p) titanium oxide
(q) barium oxide
(r) zinc hydroxide
(s) tin hydroxide
(t) bismuth hydroxide
(u) antimony oxide
(v) manganese hydroxide
(w) aluminum
(x) iron carbonate
(y) cobalt hydroxide with 10 parts by weight of calcium hydroxide
(z) mixtures thereof

EXAMPLE 9

Example 1 is modified wherein another salt-forming acidic compound is used in place of phosphoric acid and selected from the list below:
(a) phosphinic acid
(b) phosphinous acid
(c) phosphorus trichloride
(d) phosphorus oxychloride
(e) hypophosphorus acid
(f) sulfurous acid
(g) pyrosulfuric acid
(h) sulfuryl chloride

EXAMPLE 10

About 100 parts by weight of the liquid polyepoxy resin-powdered sodium silicate emulsion produced in Example 5 is mixed with 50 parts by weight of the liquid diethylenediamine fatty acid compensation-powdered sodium silicate glass emulsion as produced in Example 6 g. The mixture slowly solidifies over a period of 1-6 hours, thereby producing a strong solid epoxy resin.

EXAMPLE 11

About 100 parts by weight of the liquid polyester resin-powdered sodium silicate glass emulsion is solidified by adding a catalytic amount, at least 30 ppm of cobalt naphthanate and a catalytic amount of methyl ethyl ketone peroxide in the amount 0.5 parts by weight then thoroughly mixing. The emulsion solidifies to produce strong, solid polyester material.

EXAMPLE 12

About 100 parts by weight of the polypropylene triol-powdered sodium silicate glass emulsion is produced in Example 1, 0.5 parts by weight of a silicone foam stabilizer (Union Carbide's L6202), 0.01 parts by weight of organic tin catalyst (DABCO $T_{12}$ by Air Products) and 2 parts by weight of water are mixed, then 18 parts by weight of tolylene diisocyanate (TDI 80 by MOBAY) are thoroughly mixed. The mixture slowly expands to produce a flexible foam of about 1.5-2 pounds per cu. ft.

EXAMPLE 13

Example 12 is modified wherein 30 parts by weight of Polymeric MDI (MONDUR MR by MOBAY) is used in place of TDI 80 thereby producing a flexible foam.

EXAMPLE 14

Example 12 is modified wherein the polypropylene triol-powdered sodium silicate glass emulsion is replaced with an emulsion listed below:
(a) Emulsion of Example 4a
(b) Emulsion of Example 4k (c) Emulsion of Example 3f
(d) Emulsion of Example 3g
(e) Emulsion of Example 3h
(f) Emulsion of Example 3k
(g) Emulsion of Example 3r
(h) Emulsion of Example 4r
(i) Emulsion of Example 4s
(j) Emulsion of Example 4t
(k) Emulsion of Example 4c
(l) mixtures thereof

EXAMPLE 15

About 100 parts by weight of the sucrose polyol-powdered sodium silicate glass emulsion as produced in Example 4b, 0.5 parts by weight of a silicone foam stabilizer (L5420 by UNION CARBIDE), 0.02 parts by weight of an organic tin catalyst (DABCO $T_{12}$ by AIR PRODUCTS), 0.2 parts by weight of an amine catalyst (DABCO R 8020 by AIR PRODUCTS) and 5 parts by weight of freon 11 are mixed, then mixed with 80 parts by weight of Polymeric MDI (MONDUR MR by MOBAY). The mixture expands to produce a rigid foamed product of about 2 lb. per cu. ft.

EXAMPLE 16

Example 15 is modified wherein the sucrose polyol-powdered sodium silicate glass emulsion is replaced with an emulsion listed below:
(a) Emulsion of Example 4e
(b) Emulsion of Example 4f
(c) Emulsion of Example 4g
(d) Emulsion of Example 4j
(e) Emulsion of Example 5
(f) Emulsion of Example 6a
(g) Emulsion of Example 6c
(h) Emulsion of Example 6d
(i) Emulsion of Example 7h
(j) Emulsion of Example 8e
(k) Emulsion of Example 8k
(l) Emulsion of Example 8m

EXAMPLE 17

Example 15 is modified wherein the polyisocyanate is replaced with a polyisocyanate listed below:
(a) polymeric MDI (PAPI 27 by UPJON)
(b) modified polyisocyanate (MONDUR T-422 by MOBAY)
(c) polymethylene polyphenyl isocyanate (MONDUR MRS by MOBAY)
(d) aromatic polyisocyanate (MONDUR M-294 by MOBAY)
(e) modified toluene diisocyanate (MONDUR E-466 by MOBAY)

EXAMPLE 18

Example 15 is modified wherein the Polymeric MDI is replaced with 120 parts by weight of the polyisocyanate-powdered sodium silicate glass emulsion as produced in Example 7a.

EXAMPLE 19

Tolylene diisocyanate is reacted with hydroxyethyl methacrylate to produce a NCO-terminated prepolymer, then about 100 parts by weight of the prepolymer is mixed with 50 parts by weight of glycerol-powdered sodium silicate glass emulsion as produced in Example 14 and a catalytic amount of organic hydroperoxide. The mixture solidifies into tough solid material.

Other unsaturated aliphatic isocyanate which have double-bond vinyl functionality and isocyanate functionality in the same molecule may be used in place of the above prepolymer.

Although specific materials and conditions were set forth in the above examples, these are merely illustrative of preferred embodiment of my invention. Various other compositions, such as the typical materials listed above may be used where suitable. The reactive mixtures and products of my invention may have other agents added hereto to enhance or otherwise modify the reaction and products.

Other modifications of my invention will occur to those skilled in the art upon reading my disclosure. These are intended to be included within the scope of my invention as defined in the appended claims.

I claim:

1. The process for the production of stable liquid organic-powdered inorganic emulsions and suspensions which consists of mixing and reacting the following components:
   Component A: liquid organic compound that will react with a polyvalent acidic salt forming compound in the amount of 100 parts by weight;
   Component B: Inorganic polyvalent salt-forming acidic compound in the amount of 1.5 to 20 parts by weight:
   Component C: powdered inorganic compound in an amount of 1 to 200 parts by weight;
   Component D: salt forming basic compound in an amount up to 200 parts by weight;
   the said mixing is carries out in such a way components A and B are reacted first then components C and D are added.

2. Stable liquid organic-powdered inorganic emulsions and suspensions produced by the process which consists of mixing and reacting the following components:
   Component A: liquid organic compound that will react with a polyvalent acidic salt-forming compound in the amount of 100 parts by weight;
   Component B: inorganic polyvalent salt-forming compound in the amount of 0.5 to 20 parts by weight;
   Component C: powdered inorganic compound in an amount of 1 to 200 parts by weight;
   Component D: salt forming basic compound in an amount up to 200 parts by weight;
   the said mixing is carried out in such a way components A and B are reacted first to produce an organic-inorganic surface active compound then components C and D are added.

3. The process of claim 1 wherein the liquid organic compound is selected from the group consisting of polyols, polyesters, polyester resins, polyamides, polyepoxy compounds, alcohols, phenoplasts, aminoplasts, amines, polyamines, polythioester, polyacetals, polycarbonates, polyesteramides, polyisocanate, unsaturated aliphatic isocyanate which have double-bond vinyl functionality and isocyanate functionality on the same molecule and mixtures thereof.

4. The process of claim 1 wherein the polyvalent acidic salt forming compound is selected from the group consisting of sulfuric acid, phosphoric acid, dihydrogen phosphate salts, hydrogen sulfuric acid salts, sulfurous acid, phosphinic acid, phosphinous acid, phosphine oxide, phosphorus trichloride, organic acid phosphates, phosphorus oxychloride, hypophosphorous acid and mixtures thereof.

5. The process for the production of stable liquid organic-powdered inorganic emulsions and suspensions which consists of mixing and reacting the following components:
   Component A: liquid organic compound that will react with a polyvalent acidic salt-forming compound in the amount of 100 parts by weight;
   Component B: inorganic polyvalent salt-forming acidic compound in the amount of 0.5 to 20 parts by weight;
   Component C: powdered inorganic compound in an amount of 1 to 200 parts by weight;
   Component D: salt-forming basic compound, selected from the group consisting of alkali metal compounds, alkaline earth metal compounds, metal compounds, ammonia compounds and mixtures thereof, in the amount up to 200 parts by weight; the said mixing is carried out in such a way components A and B are reacted first to produce an organic-inorganic surface active compound then components C and D are added.

6. The process for the production of stable liquid organic-powdered inorganic emulsions and suspensions which consists of mixing and reacting the following components:
   Component A: liquid organic compound that will react with a polyvalent acidic salt-forming compound in the amount of 100 parts by weight;
   Component B: inorganic polyvalent salt-forming acidic compound in the amount of 0.5 to 20 parts by weight;
   Component C: powdered inorganic compound, selected from the group consisting of oxidated silicon compounds, alkali metal compounds, alkaline earth metal compounds, metal compounds and mixtures thereof, in the amount of 1 to 200 parts by weight;
   Component D: salt-forming basic compound in the amount up to 200 parts by weight;
the said mixing is carried out in such a way components A and B are reacted first to produce an organic-inorganic surface active compound then component C and D are added.

7. Stable liquid organic-powdered inorganic emulsions and suspensions produced by mixing and reacting the following components:
   Component A: liquid organic compound that will react with a polyvalent acidic salt-forming compound, in the amount of 100 parts by weight;
   Component B: inorganic polyvalent salt-forming acidic compound, in the amount of 0.5 to 20 parts by weight;
   Component C: powdered inorganic compound, in the amount of 1 to 200 parts by weight;
   Component D: salt forming basic compound, in the amount up to 200 parts by weight;
   Component E: emulsifying agent, up to 20 percent by weight is included in the reaction mixture;
the said mixing is carried out in such a way components A and B are reacted first to produce an organic-inorganic surface active compound then components C, D and E are added.

8. The process for the production of stable liquid organic-inorganic emulsions and suspensions which consists of mixing and reacting the following components:
   Component A: liquid organic compound that will react with a polyvalent acidic salt-forming compound in the amount of 100 parts by weight;
   Component B: inorganic polyvalent salt-forming acidic compound in the amount of 0.5 to 20 parts by weight;
   Component C: powdered inorganic compound in an amount of 1 to 200 parts by weight;
   Component D: salt-forming basic compound in an amount up to 200 parts by weight;
   Component E: organic pulverulent material;
the said mixing is carried out in such a way components A and B are reacted first to produce an organic-inorganic surface active compound then Components C, D and E are added.

9. The liquid polyol-powdered inorganic emulsion produced by reacting 0.05–20 parts by weight of phosphoric acid with 100 parts by weight of a liquid polyol thereby producing an organic-inorganic surface active compound then emulsifying the polyol-phosphoric acid surface active product with 1 to 200 parts by weight of an inorganic powder selected from the group consisting of oxidated silicon compounds, alkali metal compounds, alkaline earth metal compounds, metal compounds and mixtures thereof.

10. The liquid polyol-powdered inorganic emulsion or suspension produced by reacting 0.5–20 parts by weight of sulfuric acid with 100 parts by weight of a liquid polyol thereby producing an organic-inorganic surface active compound, then emulsify the liquid polyol-sulfuric acid product with 1 to 200 parts by weight of an inorganic powder selected from the group consisting of oxidated silicon compounds, alkali metal compounds, alkaline earth metal compounds, metal compounds and mixtures thereof.

11. The liquid polyester resin-powdered inorganic emulsion or suspension produced by reacting 0.5–20 parts by weight of phosphoric acid with 100 parts by weight of liquid polyester resin then emulsify the liquid polyester resin-phosphate surface active product with 1 to 200 parts by weight of an inorganic powder selected from the group consisting of oxidated silicon compounds, alkali metal compound, alkaline earth metal compounds, metal compounds and mixtures thereof.

12. The liquid polyepoxy resin-powdered inorganic compound emulsion or suspension produced by reacting 100 parts by weight of a liquid polyepoxy resin with 0.5 to 20 parts by weight of phosphoric acid thereby producing an organic-inorganic surface active compound then admixing 1 to 200 parts by weight of a powdered inorganic compound selected from the group consisting of oxidated silicon compounds, alkali metal compounds, alkaline earth metal compounds, metal compounds and mixtures thereof.

13. The liquid polyisocyanate-powdered inorganic compound emulsion or suspension produced by reacting 100 parts by weight of liquid polyisocyanate with 0.5 to 20 parts by weight of phosphoric acid thereby producing a surface active compound then admixing 1 to 200 parts by weight of a powdered inorganic compound selected from the group consisting of oxidated metal compounds, alkali metal compounds, alkaline earth metal compounds, metal compounds and mixtures thereof.

14. The process for the production of organic-inorganic surface active compounds which consist of mixing and reacting the following components:

Component A: liquid organic compound that will react with a polyvalent salt-forming acidic compound in the amount of 100 parts by weight and selected from the group consisting of polyether polyols, produced by the polymerization of epoxides selected from the group consisting of ethylene oxide, propylene oxide, butylene oxide, tetrahydrofuran oxide, styrene oxide or epichlorohydrin, each with itself or by addition of these epoxides, as mixtures or successively, to starting components selected from the group consisting of alcohols, amines, water, ethylene glycol, propylene glycol, trimethylol propane, 4,4-dihydrodiphenyl propane, aniline, ammonia, ethanolamine or ethylenediamine; hexane-1,6-diol; trimethylol propane; pentaerythritol; quinitol; polyesters; polyamides; alcohols; polycarboxyls; phenoplasts; aminoplasts; amines, polyamines; polythioethers; polyacetals; polycarbonates; polyesteramides; silicones; unsaturated polyester resins; polyepoxy polymers and mixtures thereof;

Component B: inorganic polyvalent salt-forming acidic compound in the amount of 0.5 to 20 parts by weight.

15. The organic-inorganic surface active compound produced by the process of claim 14.

16. An organic-inorganic surface active compound produced by mixing and reacting the following Components:

Component A: liquid compound that will react with a polyvalent acidic salt-forming compound in the amount of 100 parts by weight;

Component B: inorganic polyvalent salt-forming compound selected from the group consisting of sulfuric acid, hydrogen sulfuric acid salts, sulfurous acid, sulfur dioxide, sulfur trioxide, sulfuryl chloride, sulfamic acid and mixtures thereof, in the amount of 0.5 to 20 parts by weight.

17. An organic-inorganic surface active compound produced by mixing and reacting the following components:

Component A: liquid organic compound that will react with a polyvalent acidic salt-forming compound and is selected from the group consisting of polyesters, polyester resins, polyamides, polyepoxy compounds, alcohols, phenoplasts, aminoplasts, amines, polyamines, polythioethers, polyacetals, polycarbonates, polyesteramides, polyisocyanates, ethylene glycol, polyethylene polyols, propylene glycol, polypropylene polyols, butylene glycol, hexane-2,6-diol, octane-1,8-diol, neopentyl glycol, pentaerythritol, quinitol, polybutylene polyols, polyethers modified with vinyl polymers, polyether polyols produced by the polymerization of epoxides selected from the group consisting of ethylene oxide, propylene oxide, butylene oxide, tetrahydrofuran oxide, styrene oxide, or epichlorohydrin, each with itself or by the addition of these epoxides, as mixtures or successively, to alcohols, amines, water, ethylene glycol, propylene glycol, trimethylol propane, 4,4-dihydrodiphenyl propane, aniline, ammonia, ethanolamine or ethylenediamine, in the amount of 100 parts by weight;

Component B: inorganic polyvalent salt-forming acidic compound in the amount of 0.5 to 20 parts by weight.

18. The organic-inorganic surface active compound produced by mixing and reacting the following components:

Component A: liquid organic compound that will react with a polyvalent salt-forming acidic compound and selected from the group consisting of polyether polyols, produced by polymerization of epoxides selected from the group consisting of ethylene oxide, propylene oxide, butylene oxide, tetrahydrofuran oxide, styrene oxide or epichlorohydrin, each with itself or by addition of these epoxides, as mixtures or successively, to starting components selected from the group consisting of alcohols, amines, water, ethylene gylcol, propylene glycol, trimethylol propane, 4,4-dihydrodiphenyl propane, aniline, ammonia, ethanolamine or ethylenediamine; hexane-1,6-diol; octane-1,8-diol; neopentyl glycol; cyclohexanedimethanol; 2-methylpropane-1,3-diol; trimethylol propane; pentaerythritol; quinitol; polyesters; polyamides; alcohols; polycarboxyls; phenoplasts; aminoplasts; amines; polyamines; polythioethers; polyacetals; polycarbonates; polyesteramides; silicones; unsaturated polyester resin; polyepoxy polymers; and mixtures thereof, in the amount of 100 parts by weight;

Component B: inorganic polyvalent salt-forming acidic compound in the amount of 0.5 to 20 parts by weight;

Component D: salt forming basic compounds in the amount up to 200 parts by weight to adjust the pH; the said mixing is carried out in such a way Components A and B are reacted first to produce an organic-inorganic surface active compound then Component D is added to adjust the pH.

19. The organic-inorganic surface active compound produced by the process of claim 17 wherein the inorganic polyvalent salt-forming acidic compound is selected from a compound having an ionic group consisting of:

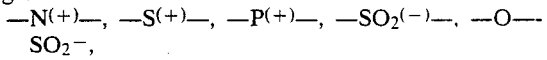

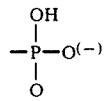

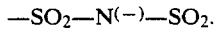

20. The stable liquid organic-powdered emulsion and suspensions produced in claim 2 wherein the inorganic polyvalent salt-forming acidic compound is selected from a compound having an ionic group consisting of:

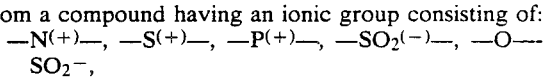

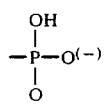

or 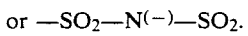

21. The product produced by the process of claim 5.
22. The product produced by the process of claim 6.
23. The product produced by the process of claim 8.